United States Patent
Lott et al.

[19]

[11] Patent Number: 5,950,418
[45] Date of Patent: Sep. 14, 1999

[54] ELECTRICAL POWER PLANT

[76] Inventors: Henry A. Lott, 818 Sugar Creek Blvd., Sugarland, Tex. 77478; John B. Goss, 1703 Earl of Dunmore, Katy, Tex. 77449

[21] Appl. No.: 08/864,330

[22] Filed: May 28, 1997

[51] Int. Cl.[6] ............................. F02C 6/00; F02C 1/06; F01K 7/22
[52] U.S. Cl. .................. 60/39.182; 60/39.04; 60/39.07; 60/39.17; 60/676; 60/679
[58] Field of Search .............. 60/39.02, 39.04, 60/39.07, 39.161, 39.17, 39.182, 676, 679

[56] References Cited

U.S. PATENT DOCUMENTS

| | | | |
|---|---|---|---|
| 1,712,992 | 5/1929 | Herrmann | 60/676 |
| 1,988,456 | 1/1935 | Lysholm | 60/42 |
| 2,476,031 | 7/1949 | Farkas et al. | 60/44 |
| 3,101,592 | 8/1963 | Robertson et al. | 60/39.46 |
| 3,238,719 | 3/1966 | Harslem | 60/39.55 |
| 3,328,957 | 7/1967 | Rose | 60/39.46 |
| 4,003,345 | 1/1977 | Bradley | 123/3 |
| 4,148,185 | 4/1979 | Somers | 60/39.17 |
| 4,369,737 | 1/1983 | Sanders et al. | 123/3 |
| 4,474,140 | 10/1984 | Sternfeld et al. | 122/31 R |
| 5,181,381 | 1/1993 | Gounder | 60/676 |
| 5,622,043 | 4/1997 | Humphries, Jr. | 60/39.182 |
| 5,634,327 | 6/1997 | Kamber et al. | 60/39.03 |
| 5,640,840 | 6/1997 | Briesch | 60/39.05 |
| 5,640,842 | 6/1997 | Bronicki | 60/39.181 |
| 5,660,037 | 8/1997 | Termuehlen | 60/39.02 |
| 5,775,091 | 7/1998 | Bannister et al. | 60/39.17 |

*Primary Examiner*—Charles G. Freay
*Attorney, Agent, or Firm*—Guy McClung

[57] ABSTRACT

An electrical power generating system has been invented, with, in one aspect, a combustion chamber for the combustion of oxygen and hydrogen and for producing hot water and hot gas, a first turbine system fired by the hot gas from the combustion chamber producing electrical power and hot water, a tank for the collection of hot water from the combustion chamber and from the first turbine system, a steam boiler receiving hot water from the tank and producing steam, a second turbine system run by the steam from the steam boiler and producing electrical power and hot water. A method for producing electrical power has been invented using such an electrical power generating system.

20 Claims, 2 Drawing Sheets

ELECTRICAL POWER PLANT

BACKGROUND OF THE INVENTION

1. Field Of The Invention

This invention is directed to electric power plants, to efficient methods for efficiently combusting hydrogen and oxygen (in one aspect oxygen from air), and to methods for producing and using pure water.

2. Description of Related Art

The prior art discloses a wide variety of plants and apparatuses for generating electricity using steam turbines. U.S. Pat. No. 4,148,185 discusses the generation of power from the combustion of hydrogen and oxygen cryogenic propellants for the electrolytic release of hydrogen from water to produce oxygen which can also be stored for subsequent combustion to generate power when needed. The separately stored oxygen and hydrogen are combusted together in the presence of a combustion flame coolant (water) to develop a motive fluid (steam) which is first passed through a heat exchanger and then to a turbine inlet. The motive fluid is exhausted from the turbine and reheated in the heat exchanger via the first passage therethrough and then delivered to the inlet of a second turbine. It is then exhausted into a condenser producing waste heat with a portion being re-introduced into the combustor for again cooling the combustion process. Such a system has a motive fluid inlet temperature of 2100° F. or above (a typical gas turbine inlet temperature), the inlet temperature to the preceding heat exchanger is at least as high as the initial inlet temperature to the first turbine plus the temperature rise required in the heat exchanger to raise the exhaust motive fluid from the first turbine the inlet temperature of the second turbine. With the present turbine inlet temperatures being in the range of 2100°, the heat exchanger inlet temperature is up to 3,000° F. This temperature requirement places design restrictions on the heat exchanger that are difficult to accommodate economically and still provide the long-life expected of equipment in power generating systems.

U.S. Pat. No. 4,148,185 discloses a gas turbine power generation system using high pressure hydrogen and oxygen as the fuel for the gas turbines with the combustion process cooled by the introduction of water or steam so that the combustion temperature range is acceptable. A series of gas turbine engines are connected in series-flow communication so that the reheat of the motive fluid (the combustion of oxygen and hydrogen producing a motive fluid of steam) for the second and subsequent turbines of the system is accomplished by directing the exhaust steam of the preceding turbine into the next downstream combustor wherein the steam is reheated by the combustion therein to the next turbine inlet temperature. Such reheating process can continue for sufficient stages until the pressure of the steam exhaust is at generally atmospheric pressure. The steam is finally exhausted through a heat exchanger to pre-heat the pressurized coolant water to at least partially convert it to steam (which conversion is completed by the combustion in the first combustion chamber or by a two-stage combustion therein) for entry into the initial combustor to cool the combustion process. The use of the combination reheat and the exhaust recuperation in the gas turbine system with hydrogen and oxygen as the combustion fuels maintains the temperature on the various parts, including the rotating members of the turbine engines, within acceptable limits for long-life operation and also increases the efficiency of the over-all power generation system.

U.S. Pat. No. 5,622,043 discloses an electric power generation with a gas turbine subsystem free of a compressor; a compressor subsystem with an air heater remote from the gas turbine subsystem having an inlet receiving air and an outlet furnishing heated compressed air after heating by the air heater; and a compressed air line interlinking the outlet and said gas turbine subsystem; the gas turbine subsystem having a plenum connected to the compressed air line; a burn chamber having a compressed air inlet connected to the plenum and a fuel inlet; a gas expander connected to the burn chamber; and an electrical generator connected to the gas expander; a steam generator having a heat inlet connected to the gas expander and a steam outlet; a first steam turbine having a steam inlet connected to the steam outlet; and a drive shaft connected to the electrical generator.

SUMMARY OF THE PRESENT INVENTION

The present invention, in certain embodiments, discloses an electrical power generating plant that has a combustion chamber to which air or oxygen and hydrogen are fed continuously. In one aspect, air injected into the combustion chamber provides the required oxygen for the combustion of hydrogen. The mixture is ignited, e.g. by a continuous spark in the combustion chamber.

Combustion of the air (or oxygen) and hydrogen produces two streams: a stream of pure hot water (at about 190° F.) which flows (e.g. by pressure resulting from combustion) to an insulated holding tank through a volume/temperature control valve. A stream of hot gas and vapor flows to a gas turbine (e.g. at a pressure of about 300 p.s.i. [controlled, e.g. by controlling the volume of gasses in the combustion chamber) and at a temperature of about 500° F.]. The hot gas stream is fed to a conventional first gas turbine/electric generator system ("first turbine system") which produces electrical power. An exhaust stream from the first turbine system contains hot gas and vapor (e.g. steam).

The hot gas in the first turbine exhaust is fed to an exhaust stack for release to the atmosphere or for collection and further treatment.

A pump pumps the hot water from the insulated holding tank to a conventional steam boiler. The boiler produces two streams: an exhaust stream containing fuel residue and a steam stream that is fed to a second turbine system. The boiler is fired by conventional means, e.g., natural gas.

The second turbine system has a conventional steam turbine/electrical generator combination and is powered by the steam from the steam boiler. The second turbine system produces electrical power and a vapor exhaust stream.

The vapor exhaust stream is fed to a steam condenser, producing hot water. The hot water may be fed to the insulated holding tank and any excess exhaust stream is fed to the exhaust stack. Appropriate valve, gauges, and controls are used in the various flow lines between apparatuses.

The hot exhaust of the first turbine system, the second turbine system, or both may be used, in certain aspects, to heat air (or oxygen and hydrogen) fed to the combustion chamber.

Pure water produced by the combustion step reduces or eliminates the interior scaling and stoppage on tubes, conduits and flow lines and inhibits corrosion of them. No additives are necessary to purify such water or to make it usable. Therefore, the need to use chemicals to clean the system, particularly the steam producing apparatus, is reduced or eliminated.

Exhaust from the steam turbines may be, in certain aspects, scavenged for use in other systems or for return to a steam boiler.

The present invention, in certain aspects, discloses an electrical power generating system with a combustion chamber for receiving and for combusting therein oxygen and hydrogen, producing hot water and hot gas, a first turbine/generator system fired by the hot gas from the combustion chamber, the first turbine/generator system producing electrical power and hot water, a tank for the collection of hot water from the combustion chamber and from the first turbine/generator system, a steam boiler receiving hot water from the tank and producing steam, and a second turbine/generator system run by the steam from the steam boiler and producing electrical power and hot water; such a power generating system with a pump for pumping hot water from the tank to the steam boiler; such an electrical power generating system wherein the tank is an insulated tank, wherein the first turbine/generator system produces an exhaust gas and the electrical power generator system has an exhaust stack for receiving the exhaust gas and for exhausting it, and/or with a first collection/treatment system for receiving and treating exhaust from the exhaust stack; any such electrical power generating system wherein the first turbine/generator system has a turbine from which water vapor is exhausted and the electrical power generating system has a condenser for receiving the water vapor from the turbine of the first turbine/generator system, the first condenser for producing water flowable to the tank, and a water flow line from the first condenser to the tank; any such electrical power generating system wherein the second turbine/generator system has a turbine from which water vapor is exhausted and the electrical power generating system has a condenser for receiving the water vapor from the turbine of the second turbine/generator system, the first condenser for producing water flowable to the tank, and a water flow line from the first condenser to the tank; such as an electrical power generating system wherein the second condenser produces a stream with water and gas and the electrical power generating system has a second collection/treatment system for receiving and treating gas in the stream from the second condenser; any such electrical power generating system wherein the steam boiler is fired by natural gas and produces exhaust gas, the electrical power generating system has an exhaust stack, and a boiler exhaust line through which flows the exhaust gas from the steam boiler to the exhaust stack; any such electrical power generating system wherein the oxygen is contained in air input to the combustion chamber and wherein the hot water produced in the combustion chamber is pure; any such electrical power generating system with a preheater in fluid communication with the combustion chamber for preheating the oxygen and hydrogen; any such electrical power generating system with heat capture apparatus for capturing heat from an exhaust from a turbine of the first turbine/generator system and for introducing said captured heat to the preheater; any such electrical power generating system with heat capture apparatus for capturing heat from an exhaust from a turbine of the second turbine/generator system and for introducing said captured heat to the preheater; any such electrical power generating system with scavenge apparatus for collecting heat from an exhaust from a turbine of the first turbine/generator system for heating water flowing to the steam boiler; any such electrical power generating system with scavenge apparatus for collecting heat from an exhaust from a turbine of the second turbine/generator system for heating water flowing to the steam boiler; any such electrical power generating system wherein the preheater produces nitrogen and the electrical power generating system has nitrogen collection apparatus for collecting the nitrogen.

The present invention, in certain aspects, discloses an electrical power generating system with a combustion chamber for receiving and for combusting therein oxygen and hydrogen, producing hot water and hot gas, a first turbine/generator system fired by the hot gas from the combustion chamber, the first turbine/generator system producing electrical power and hot water, a tank for the collection of hot water from the combustion chamber and from the first turbine/generator system, a steam boiler receiving hot water from the tank and producing steam, a second turbine/generator system run by the steam from the steam boiler and producing electrical power and hot water, the first turbine/generator system producing an exhaust gas, an exhaust stack for receiving the exhaust gas and for exhausting it, the first turbine/generator system having a first turbine from which water vapor is exhausted, a condenser for receiving the water vapor from the turbine of the first turbine/generator system, the first condenser for producing water flowable to the tank, a water flow line from the first condenser to the tank, the second turbine/generator system having a second turbine from which water vapor is exhausted, a second condenser for receiving the water vapor from the turbine of the second turbine/generator system, the second condenser for producing water flowable to the tank, a water flow line from the second condenser to the tank, a preheater in fluid communication with the combustion chamber for preheating the oxygen and hydrogen, heat capture apparatus for capturing heat from an exhaust from a turbine of the first turbine/generator system and for introducing said captured heat to the preheater, and scavenge apparatus for collecting heat from an exhaust from a turbine of the first turbine/generator system for heating water flowing to the steam boiler.

The present invention discloses in certain aspects, a method for producing electrical power that includes feeding oxygen and hydrogen to a combustion chamber of an electrical power generating system, the electrical power generating system comprising a combustion chamber for the combustion of oxygen and hydrogen, producing hot water and hot gas, a first turbine system fired by the hot gas from the combustion chamber producing electrical power and hot water, a tank for the collection of hot water from the combustion chamber and from the first turbine system, a steam boiler receiving hot water from the tank and producing steam, a second turbine system run by the steam from the steam boiler and producing electrical power and hot water; producing hot water and hot gas in the combustion chamber; firing a first turbine system with the hot gas from the combustion chamber to produce electrical power and hot water; feeding the hot water from the combustion chamber to a holding tank; feeding hot water from the holding tank to a steam boiler; producing steam with the steam boiler; feeding the steam to a second turbine system; and producing electrical power and hot water with the second turbine system; such a method wherein the electrical power generating system has a preheater for preheating oxygen and hydrogen input to the combustion chamber and the method includes preheating oxygen and hydrogen input to the combustion chamber; and such a method wherein the preheater produces nitrogen and the method includes collecting nitrogen from the preheater.

It is, therefore, an object of at least certain preferred embodiments of the present invention to provide:

New, useful, unique, efficient, nonobvious apparatus and methods for producing electrical power;

Such apparatuses and methods which produce pure water (or almost pure) and/or pure (or almost pure) steam from the combustion of air or of oxygen and hydrogen and which do produce little or no harmful emissions to the atmosphere;

Such apparatuses and methods in which steam from an initial air combustion powers a turbine system and produces hot water which, in one aspect, is combined with hot water from the air combustion to feed a steam boiler;

Such apparatuses and methods in which the exhaust from a second turbine system powered by steam from the steam boiler provides hot water and/or heat for use elsewhere in the overall system; and Such methods which are user-friendly and produce a minimum or no polluting waste.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

DESCRIPTION OF EMBODIMENTS PREFERRED AT THE TIME OF FILING FOR THIS PATENT

Figure 1:
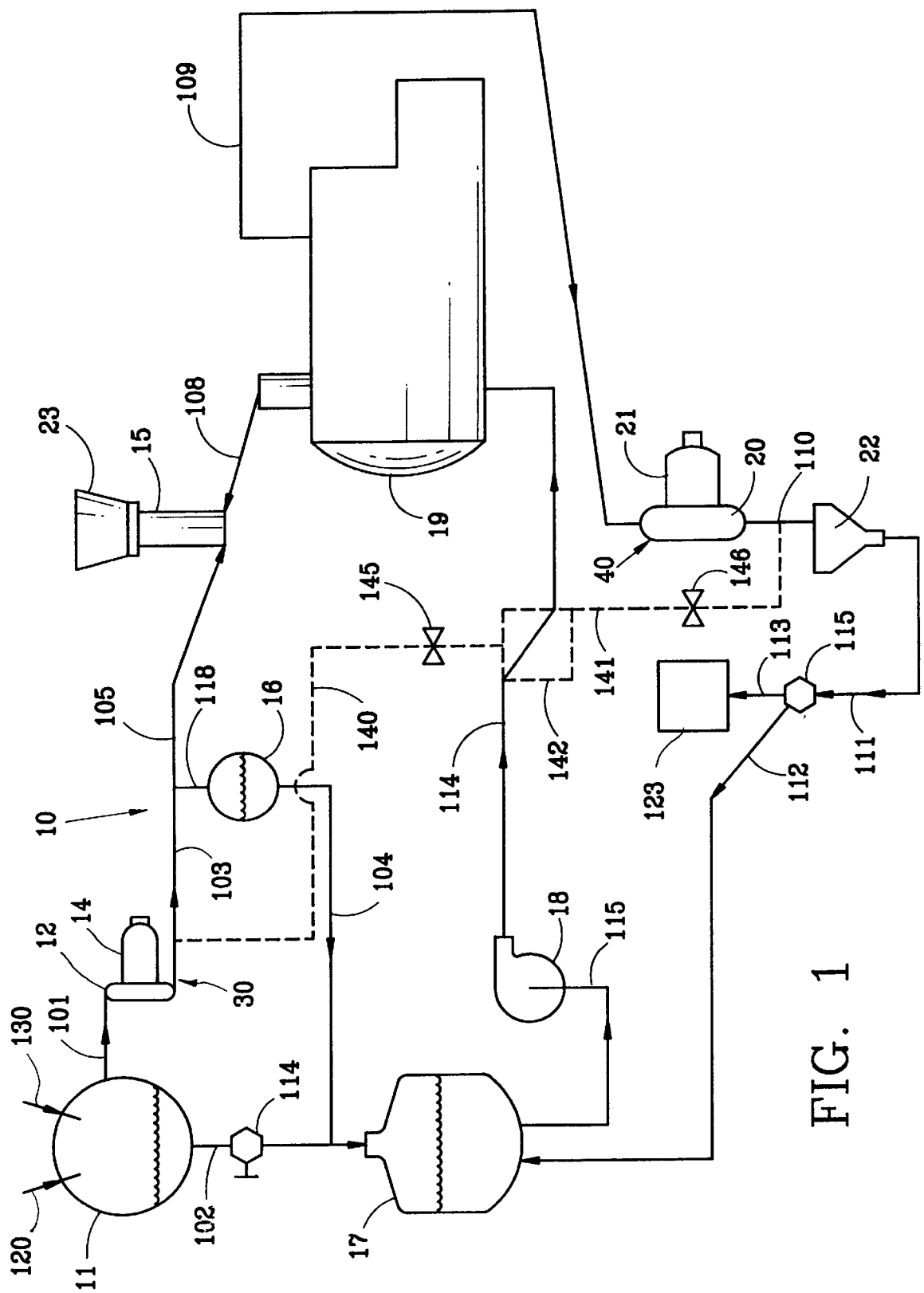
FIGS. 1 and 2 are schematic views of a system according to the present invention.

FIG. 1 shows a system 10 with a combustion chamber 11 into which air is fed in a line 120 or oxygen is introduced in the line 120 and hydrogen is introduced in the line 130.

Combustion in the combustion chamber for combusting hydrogen produces a hot gas/vapor stream that flows in a line 101 to a first turbine system 30 and hot water that flows in a line 102 to an insulated holding tank 17. A valve 114 controls flow in the line 102.

The first turbine system 30 has a gas turbine 12 fired with the gas in the line 101.

The gas turbine 12 runs an electrical generator 14 of the first turbine system 30. The electrical generator 14 produces useful electrical power and a hot exhaust gas with some steam therein in a line 103. The water and steam flow (e.g. by gravity) in a line 118 to a water condenser/accumulator 16. Exhaust gas flows in a line 105 to an exhaust stack 15 from which it is vented to the atmosphere or fed to a further collection/treatment system 23.

Hot water from the condenser accumulator 16 flows in a line 104 to the insulated holding tank 17. A pump 18 pumps hot water from a line 115 from the insulated holding tank 17 in a line 114 to a steam boiler 19 as needed. Exhaust gas from the boiler 19 flows in a line 108 to the exhaust stack 15 (or the boiler may have a separate exhaust system). Steam produced by the boiler 19 flows in a line 109 to a second turbine system 40 which has a steam turbine 20 and an electrical generator 21 that is run by the steam turbine 20.

The electrical generator 21 produces useful electrical power. Exhaust from the steam turbine 20 containing water and steam flows in a line 110 to a steam condenser 22. The steam condenser 22 produces water which flows in a line 111, and through a control valve/splitter 115. Water flows from the control valve/splitter 115 in a line 112 to the insulated holding tank 17. Excess water flows in a line 113 to collection apparatus 123.

Pumps may be used on any line to facilitate flow where gravity is insufficient for the desired flow rate.

As shown in FIG. 1 an optional heat scavenging system 142 may be used to scavenge heat from the turbine exhausts in lines 140 and 141. This heat is then used by the system 142 to heat water in the line 114 that is then fed to the boiler 19. With valves 145, 146 respectively, either line 140, 141 may be closed (or open) to flow.

The water produced in the combustion chamber 11 is very pure, substantially mineral/chemical free, and is, preferably, used throughout the system 10 to reduce corrosion and mineral deposits. The exhaust in the line 103, the exhaust in the line 110 and/or a combination thereof, may be used to pre-heat the feed or feeds to the combustion chamber 11. These exhausts may also be used to pre-heat feed to the steam boiler 19 in the line 107. Heat maybe scavenged from the lines 108 and 105 for re-use in the system 10. A steam boiler stacked pre-heater may be used to preheat water fed to the steam boiler.

In one aspect when about one pound of hydrogen (about 191 cubic feet) and about thirty four pounds of air (about 454 cubic feet) are input into the combustion chamber, about 61,000 Btu's are produced (about 319 Btu/cubic foot of hydrogen) and about 8.94 pounds of water (about 1 gallon) are produced. 61,000 Btu's produce about 1437 horsepower per minute for driving a turbine.

Figure 2:
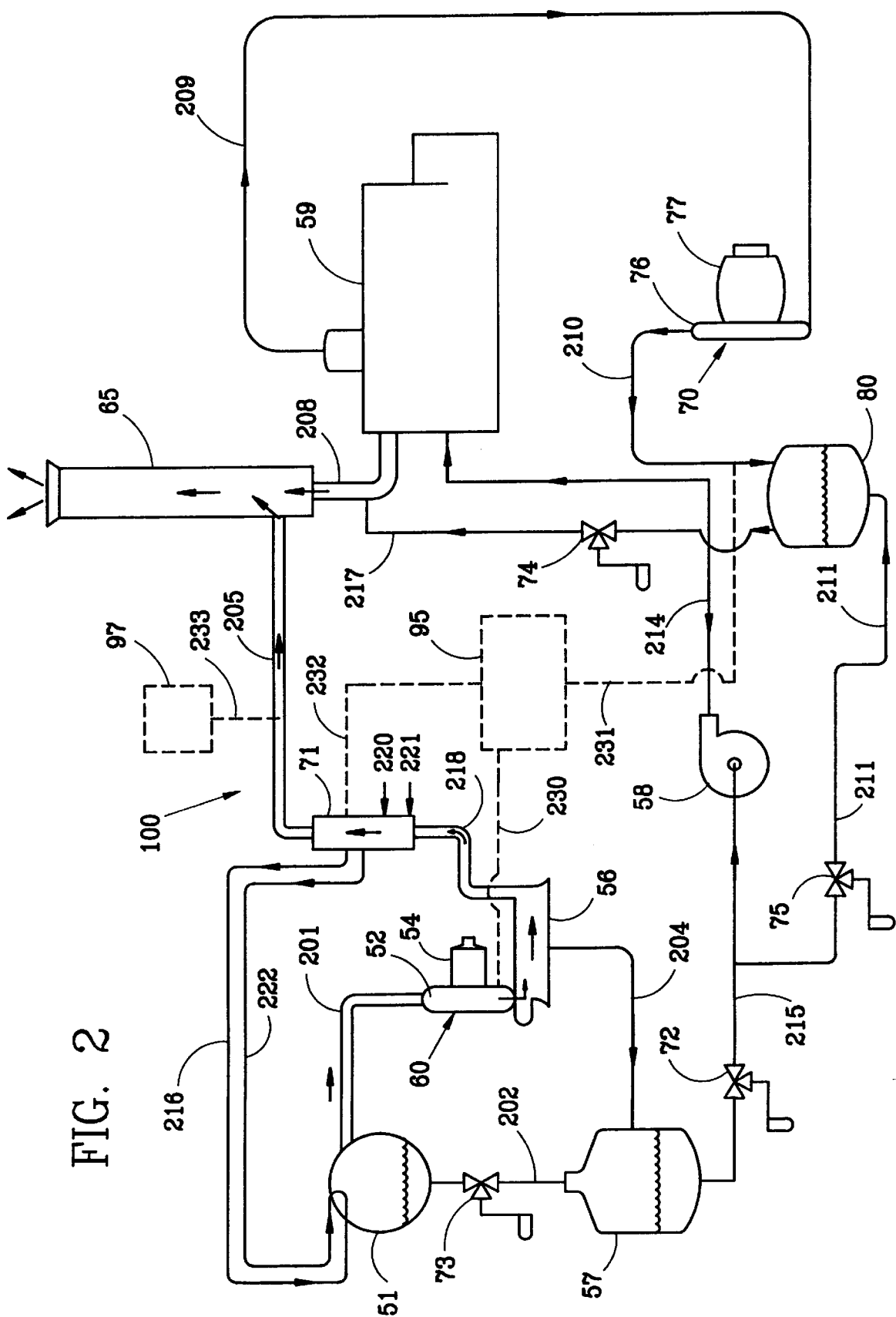

FIG. 2 shows a system 100 with a combustion chamber 51 into which preheated air is fed in a line 216 (or oxygen is introduced in the line 216) and hydrogen is introduced in the line 222. A preheater 71 preheats air (or oxygen) fed into it in a line 220 and hydrogen fed into it in a line 221 (e.g., in one aspect, preheats the gasses to about 250 degrees F.)

Combustion in the combustion chamber 51 produces a hot gas/vapor stream that flows in a line 201 to a first turbine system 60 and hot water that flows in a line 202 to an insulated holding tank 57. A valve 73 controls flow in the line 202.

The first turbine system 60 has a gas turbine 52 fired with the gas in the line 201.

The gas turbine 52 runs an electrical generator 54 of the first turbine system 30. The electrical generator 54 produces useful electrical power and a hot exhaust gas with some water therein that flows to a condenser 56. Exhaust gas flows in a line 218 to the preheater 71. Nitrogen (and other air components if air is used as an initial feed) flows in a line 205 to an exhaust stack 65 where it is vented to the atmosphere or fed to a further collection/treatment system.

Hot water from the condenser accumulator 56 flows in a line 204 to the insulated holding tank 57. A pump 58 pumps hot water in a line 205 from the insulated holding tank 57 in a line 214 to a steam boiler 59. Exhaust gas from the boiler 59 flows in a line 208 to the exhaust stack 65 (or the boiler may have a separate exhaust system). Steam produced by the boiler 59 flows in a line 209 to a second turbine system 70 which has a steam turbine 76 and an electrical generator 77 that is run by the steam turbine 76. The electrical generator 77 produces useful electrical power. Exhaust from the steam turbine 76 containing water and steam flows in a line 210 to a condenser 80. The condenser 80 produces water which flows in a line 211, and through a control valve 75 to the line 215, through the control valve 72 to the insulated holding tank 57. Exhaust gas from the condenser 80 flows in a line 217 to the exhaust stack 65 or to other exhaust/collection/treatment apparatus. A valve 74 controls flow in the line 217. With the valve 72 closed, water/steam flows from the line 211 to the pump 58 for recycle to the boiler 59.

As shown in FIG. 2 optional heat capture apparatus 95 may be used to capture heat from the turbine exhausts in lines 230 and 231. Such heat is then fed by the apparatus 95 in a line 232 (e.g. the heat of hot water and/or steam; apparatus 95 is any suitable known heat exchanger) to the preheater 71 to assist in the preheating of gasses therein. Alternatively, such heat may be used on line 220, line 221, or both.

An optional nitrogen collection apparatus collects nitrogen from the line 205 via a line 233.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112.

What is claimed is:

1. An electrical power generating system comprising
   a combustion chamber for receiving and for combusting therein oxygen and hydrogen, producing hot water and hot gas,
   a first turbine/generator system driven by the hot gas from the combustion chamber, the first turbine/generator system producing electrical power and hot water,
   a tank for the collection of hot water from the combustion chamber and from the first turbine/generator system,
   a steam boiler receiving hot water from the tank and producing steam, and
   a second turbine/generator system run by the steam from the steam boiler and producing electrical power and hot water.

2. The electrical power generating system of claim 1 further comprising
   a pump for pumping hot water from the tank to the steam boiler.

3. The electrical power generating system of claim 1 wherein the tank is an insulated tank.

4. The electrical power generating system of claim 1 wherein the first turbine/generator system produces an exhaust gas and the electrical power generator system further comprising
   an exhaust stack for receiving the exhaust gas and for exhausting it.

5. The electrical power generating system of claim 4 further comprising
   a first collection/treatment system for receiving and treating exhaust from the exhaust stack.

6. The electrical power generating system of claim 1 wherein the first turbine/generator system has a turbine from which water vapor is exhausted and the electrical power generating system further comprises
   a condenser for receiving the water vapor from the turbine of the first turbine/generator system, the first condenser for producing water flowable to the tank, and
   a water flow line from the first condenser to the tank.

7. The electrical power generating system of claim 1 wherein the second turbine/generator system has a turbine from which water vapor is exhausted and the electrical power generating system further comprises
   a condenser for receiving the water vapor from the turbine of the second turbine/generator system, the condenser for producing water flowable to the tank, and
   a water flow line from the condenser to the tank.

8. The electrical power generating system of claim 7 wherein the second condenser produces a stream with water and gas and the electrical power generating system further comprises
   a second collection/treatment system for receiving and treating gas in the stream from the second condenser.

9. The electrical power generating system of claim 1 wherein the steam boiler is fired by natural gas and produces exhaust gas, the electrical power generating system further comprises
   an exhaust stack, and
   a boiler exhaust line through which flows the exhaust gas from the steam boiler to the exhaust stack.

10. The electrical power generating system of claim 1 wherein the oxygen is contained in air input to the combustion chamber and wherein the hot water produced in the combustion chamber is pure.

11. The electrical power generating system of claim 1 further comprising
    a preheater in fluid communication with the combustion chamber for preheating the oxygen and hydrogen.

12. The electrical power generating system of claim 11 further comprising
    heat capture apparatus for capturing heat from an exhaust from a turbine of the first turbine/generator system and for introducing said captured heat to the preheater.

13. The electrical power generating system of claim 11 further comprising heat capture apparatus for capturing heat from an exhaust from a turbine of the second turbine/generator system and for introducing said captured heat to the preheater.

14. The electrical power generating system of claim 1 further comprising scavenge apparatus for collecting heat from an exhaust from a turbine of the first turbine/generator system for heating water flowing to the steam boiler.

15. The electrical power generating system of claim 11 further comprising scavenge apparatus for collecting heat from an exhaust from a turbine of the second turbine/generator system for heating water flowing to the steam boiler.

16. The electrical power generating system of claim 11 wherein the preheater produces nitrogen and the electrical power generating system further comprises nitrogen collection apparatus for collecting the nitrogen.

17. An electrical power generating system comprising a combustion chamber for receiving and for combusting therein oxygen and hydrogen, producing hot water and hot gas, a first turbine/generator system driven by the hot gas from the combustion chamber, the first turbine/generator system producing electrical power and hot water, a tank for the collection of hot water from the combustion chamber and from the first turbine/generator system, a steam boiler receiving hot water from the tank and producing steam, a second turbine/generator system run by the steam from the steam boiler and producing electrical power and hot water, the first turbine/generator system producing an exhaust gas and the electrical power generator system further comprising an exhaust stack for receiving the exhaust gas and for exhausting it, the first turbine/generator system having a first turbine from which water vapor is exhausted and the electrical power generating system further comprising a first condenser for receiving the water vapor from the turbine of the first turbine/generator system, the first condenser for producing water flowable to the tank, and a water flow line from the first condenser to the tank, the second turbine/generator system having a second turbine from which water vapor is exhausted and the electrical power generating system further comprising a second condenser for receiving the water vapor from the turbine of the second turbine/generator system, the second condenser for producing water flowable to the tank, a water flow line from the second condenser to the tank, a preheater in fluid communication with the combustion chamber for preheating the oxygen and hydrogen, heat capture apparatus for capturing heat from an exhaust from a turbine of the first turbine/generator system and for introducing said captured heat to the preheater, and scavenge apparatus for collecting heat from an exhaust from a turbine of the first turbine/generator system for heating water flowing to the steam boiler.

18. A method for producing electrical power, the method comprising feeding oxygen and hydrogen to a combustion chamber of an electrical power generating system, the electrical power generating system comprising a combustion chamber for the combustion of oxygen and hydrogen, producing hot water and hot gas, a first turbine system driven by the hot gas from the combustion chamber producing electrical power and hot water, a holding tank for the collection of hot water from the combustion chamber and from the first turbine system, a steam boiler receiving hot water from the tank and producing steam, a second turbine system run by the steam from the steam boiler and producing electrical power and hot water, producing hot water and hot gas in the combustion chamber, driving said first turbine system with the hot gas from the combustion chamber to produce electrical power and hot water, feeding the hot water from the combustion chamber to said holding tank, feeding hot water from the holding tank to said steam boiler, producing steam with the steam boiler, feeding the steam to said second turbine system, and producing electrical power and hot water with the second turbine system.

19. The method of claim 18 wherein the electrical power generating system further comprises a preheater for preheating oxygen and hydrogen input to the combustion chamber and the method further comprising preheating oxygen and hydrogen input to the combustion chamber.

20. The method of claim 19 wherein the preheater produces nitrogen and the method further comprising collecting nitrogen from the preheater.

* * * * *